July 21, 1964 J. W. GRAY 3,141,725
COURSE PLOTTER

Filed June 11, 1962 2 Sheets-Sheet 1

*INVENTOR.*
JOHN W. GRAY

BY *H. S. Mackey*

ATTORNEY.

July 21, 1964    J. W. GRAY    3,141,725
COURSE PLOTTER

Filed June 11, 1962    2 Sheets-Sheet 2

INVENTOR.
JOHN W. GRAY

BY *H. L. Mackey*

ATTORNEY.

United States Patent Office 3,141,725
Patented July 21, 1964

3,141,725
COURSE PLOTTER
John W. Gray, Pleasantville, N.Y., assignor to General
Precision, Inc., a corporation of Delaware
Filed June 11, 1962, Ser. No. 201,640
5 Claims. (Cl. 346—8)

This invention relates to devices for automatically plotting the course of a marine vessel.

The purpose of this invention is to provide an instrument for use on a marine vessel in plotting a line on a chart representing the path of the vessel. The instrument may be employed on any vessel on which the required input data, consisting of speed and heading, are available. The instrument is especially adapted for use on boats too small to have a chart room and the usual facilities for plotting the course by hand. The invention is thus particularly useful on pleasure craft, tugs and commercial fishing boats.

The course plotter employs the output of a compass to position a shaft at an angle representing heading. This shaft positions a sine-cosine generator energized by a potential having magnitude representing boat's speed. The outputs are then potentials representing the north-south and east-west components of boat's velocity. These potentials are applied to two pulse generators which emit pulses at rates representing these velocity components. The pulse trains are applied to two orthogonal inputs of a mechanism for drawing and displaying a curve on a marine chart. One input moves a stylus in the north-south direction and the other in the east-west direction. Thus a line is drawn on the chart continuously representing the present position of the boat and recording the path which has been traversed.

A further understanding of this invention may be secured from the following detailed description and associated drawings in which.

Figure 4:
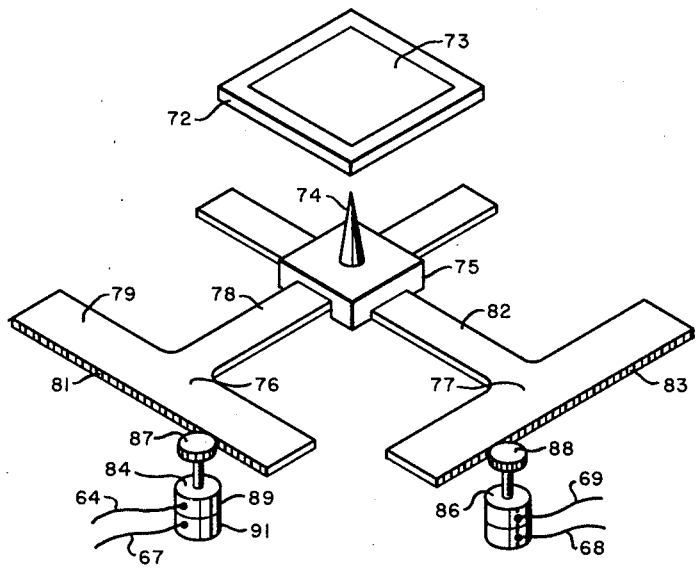

FIGURE 4 schematically represents the chart assembly mechanism.

Figure 1:
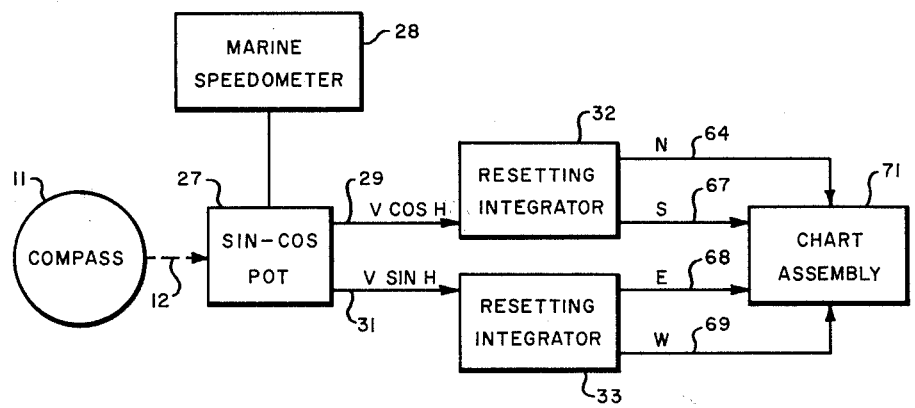
FIGURE 1 is a block diagram of an embodiment of the invention.

Referring now to FIGURE 1, a compass 11 of any type is mounted on a boat. The compass has an output shaft 12 and may be provided, if desired, with a compass card visually indicating the heading of the boat. One satisfactory type of compass is a single-phase flux gate compass such as is described in U.S. patent application Serial No. 131,592, filed August 15, 1961. This compass is briefly described as follows.

Figure 2:
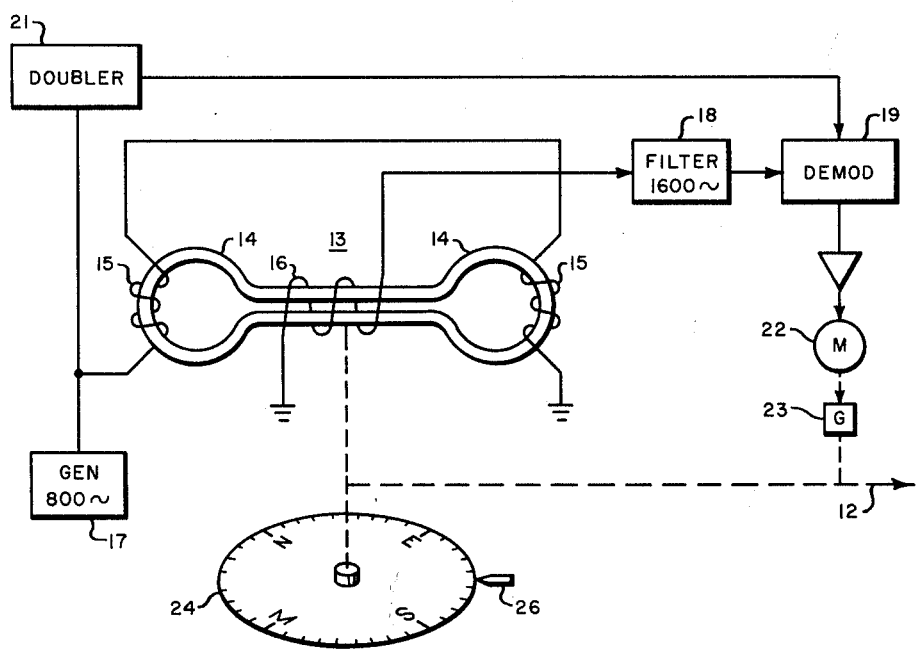
FIGURE 2 is the schematic diagram of a flux gate compass and accessory components.

The compass contains a sensitive element 13, FIGURE 2, having a soft iron core 14, exciting windings 15, and a pickup winding 16. The exciting windings 15 are energized from an 800 c.p.s. generator 17 and the pickup winding 16 is connected through a 1600-c.p.s. filter 18 to a synchronous demodulator 19 reference through a doubler 21 to the generator 17. The demodulated output is amplified and applied to a motor 22. The motor is geared down through gears 23 to rotate the sensitive element 13 in azimuth. A compass card 24 having a heading pointer 26 may be employed, geared to the sensitive element 13 in 1:1 relation. The output shaft 12 has an angular deflection representing heading.

In the operation of this compass, the exciting winding flux is powerful enough to saturate the core during most of each half-cycle so that the permeability of the iron is very low. However, each time that the 800 c.p.s. energizing current passes through zero the flux becomes zero and the permeability of the iron becomes high. If during this time the straight center part of the sensitive element 13 which is surrounded by the pickup winding 16 is not pointing in a due magnetic east-west direction, some horizontal component of the earth's field produces a magnetomotive force in the length of this straight center part of the iron core. Then, 1600 times each second a potential is induced in winding 16. This potential has magnitude and phase representing the departure of the direction of the straight part of the iron core from the east-west direction. The demodulator 19 converts this double-frequency alternating potential into a direct potential error signal having sense and magnitude, which is amplified and applied to motor 22. The motor moves the sensitive element 12 is such direction as to reduce the error signal and in doing so sets the sensitive element 13 in an exactly east-west line. This also moves the card 24 so that its north mark points exactly north, and the pointer 26, in line with the longitudinal axis of the boat, then indicates the magnetic heading of the boat. This heading is also indicated by the rotational deflection angle of the output shaft 12 from a reference position.

The shaft 12 positions a multiplier and sine-cosine generator 27, FIGURE 1, which may be, for example, a sine-cosine potentiometer. Its electrical excitation is taken from a marine speedometer 28, which may be of any type generating an electrical potential difference representing boat speed. The outputs of the sine-cosine potentiometer 27, in conductors 29 and 31, are therefore, respectively $V \cos H$ and $V \sin H$, in which V represents the boat's speed and H the boat's heading. These components are the N-S and E-W resolved components of boat's speed.

The potentials representing quanties $$V \cos H \text{ and } V \sin H$$

in conductors 29 and 31 are applied as inputs to two identical resetting integrators 32 and 33. These integrators emit pulse trains having rates representating the input quantities.

Figure 3:
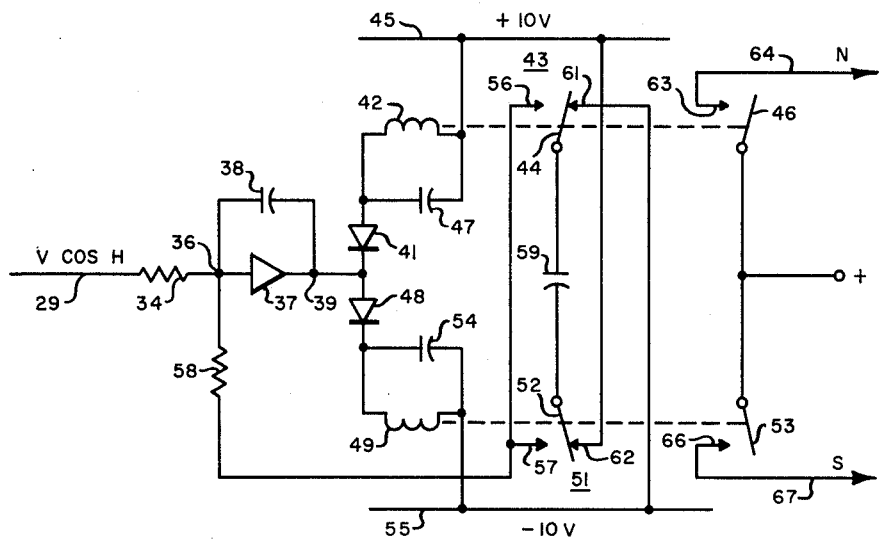
FIGURE 3 is the schematic wiring diagram of a resetting integrator forming a component of the embodiment of FIGURE 1.

The integrator circuit is shown in FIGURE 3, in which the input conductor 29 is connected through a resistor 34 to the input junction 36 of a high-gain, high input impedance, inverting amplifier 37. A capacitor 38 is connected between the input terminal 36 and the output terminal 39 of the amplifier 37. Terminal 39 is connected through a diode 41 to one terminal of the winding 42 of a relay 43 having contact arms 44 and 46. The winding 42 is shunted by a capacitor 47. The other terminal of the winding 42 is connected to a +10 volt source bus 45. Terminal 39 is also connected through a diode 48 to one terminal of the winding 49 of another relay 51 having contact arms 52 and 53. The winding 49 is shunted by a capacitor 54. The other terminal of winding 49 is connected to a −10 volt source bus 55. The fixed contacts 56 and 57, engaged by contacts 44 and 52 when the relays are operated, are connected through a resistor 58 to terminal 36. The contact arms 44 and 52 are joined through a capacitor 59. The fixed, normally closed contacts 61 and 62 are connected, respectively, to negative and positive buses 55 and 45. The contact arms 46 and 53 are connected to a source of potential. Fixed contact 63 is connected to an output conductor 64 and fixed contact 66 is connected to a second output conductor 67.

In the operation of the resetting integrator circuit shown in FIGURE 3, the input potential at conductor 29 representing a component of heading is positive or negative depending on the quadrant of the heading angle and on which component is applied. Assuming the heading angle is in the first quadrant and that the component is $V \cos H$, the potential is positive. The potential of terminal 36 remains very close to zero and substantially all of the current flowing through resistor 34 goes into capacitor 38.

At the start of the operation, both relays 43 and 51 are in their normal or unoperated condition and the potential of terminal 39 is at some point between the pickup values of the relays. The capacitor 59 has +10 volts potential on its lower plate and −10 volts potential on its upper plate. The arms 46 and 53 being in the normal position, the output conductors 64 and 67 are open at contacts 63 and 66.

During the operation, with positive potential applied to conductor 29, the integrating action of the amplifier 37 shunted by the capacitor 38 causes a continuously falling potential to be present at terminal 39. At some potential the pull-in potential of relay 43 is reached and it operates. Its contacts close, connecting the upper plate of capacitor 59 to terminal 36. Current consequently flows from terminal 36 into the upper plate of capacitor 59, causing its potential to rise from −10 volts toward zero. Substantially all of this current comes from capacitor 38. This action at the input terminal 36 of the integrator rapidly raises its output potential. This normally would cause rapid drop out of the relay 43. However, it is necessary to prevent this occurring before the upper plate of capacitor 59 has been returned all of the way to zero. Therefore delay elements consisting of the capacitance of the capacitor 47 and the resistance of the relay winding 42 are provided. The delay in relay release introduced by these delay elements must be much greater than the time constant equal to the product of the capacitance of capacitor 59 and the resistance of resistor 58. This is required because it is necessary that the charge at negative potential be drained from the upper plate of capacitor 59 and that this plate be discharged substantially to zero potential. During this discharge operation the negative potential of terminal 39 will be reduced to a lower negative or even a positive potential having a value depending on a number of design factors, but which must be intermediate between the pickup values of the two relays 43 and 51. After the potential of the upper plate of capacitor 59 has become substantially zero, and when permitted by the time constant of coil 42 and capacitor 47, relay 43 releases, the cycle recommences, and capacitor 38 again commences to charge.

During the cycle, when relay 43 is operated contacts 63 are closed and potential is applied to the output conductor 64, this potential disappearing when the relay is normal and contacts 63 are again opened. Thus a pulse train is impressed on the output conductor 64 having a rate or frequency which represents the slope of the sawtooth form at terminal 39 and thus also represents the input signal magnitude. The total number of pulses in an elapsed time therefore represents the integral of the input signal. In a similar manner, a negative input at conductor 29 produces a positive-going sawtooth at terminal 39, operates relay 51 and produces a pulse train at output conductor 67. This integrator forms the subject matter of copending application Serial Number 201,720, filed June 11, 1962.

Returning to FIGURE 1, the output conductors 64 and 67 of resetting integrator 32 and conductors 68 and 69 of integrator 33 are applied to a chart assembly 71 including a curve-drawing mechanism. The details of chart assembly 71 are indicated in FIGURE 4. A transparent glass plate 72 supports a translucent marine chart 73. The underside of the plate 72 is coated with a layer of flake aluminum which adheres to the glass without the use of an adhesive medium. A stylus 74 is positioned in contact with the underside of the glass plate 72. The stylus is fixed to a platform 75 which can be moved orthogonally by two, T-shaped members 76 and 77. Member 76 consists of a stem 78 and a cross-piece 79 provided with a toothed rack 81. Member 77 is similar, having a crosspiece 82 and rack 83.

Two pulse motors 84 and 86 of conventional construction drive pinions 87 and 88 respectively engaging the racks 81 and 83. These pulse motors 84 and 86 are similar. Each may be termed a dual rotary solenoid and contains two internal ratchets and two actuating coils. When, for example, actuating coil 89 of motor 84 is actuated by a pulse train applied through conductor 64, the motor shaft and pinion 87 rotate counterclockwise, driving the rack 81 toward the left and with it the platform 75 and stylus 74. When the actuating coil 91 is energized through conductor 67 by a pulse train, the pinion 87 is turned clockwise, driving the rack 81, platform 75 and stylus 74 toward the right. These directions of travel correspond to north and south directions on the oriented chart 73. Similarly, when pulse motor 86 is actuated by a pulse train through conductor 69, the rack 83, platform 75 and stylus 74 are driven toward the left, or in the direction of west on the chart. Energization through conductor 68 drives the stylus in the east direction. Thus, by combinations of pulse motor motions the stylus may be driven along any path.

Obviously, in place of the rack and pinion drives, the stylus may be driven from the two motors in the north and east directions by drives employing pulleys and cords.

The chart assembly details of FIGURE 4 are enclosed in a light-tight case, with the glass plate 72 forming one face thereof. Means may be provided to "erase" clear lines traced by the stylus 74 on the aluminum-flake-coated surface of the glass. One such means includes a number of small pellets which, when shaken against the glass surface, erase the lines.

In the operation of the course plotter, first, the aluminized surface of the chart assembly glass is cleared of lines and the stylus is set to that point of the chart representing present position. Ambient light, reflected from the lower aluminized surface of the glass, illuminates the translucent chart. When the boat is under way the north and east components of boat speed are applied through conductors 29 and 31, FIG. 1, to the two integrators. The speed components are integrated in the integrators to form distance components in terms of elapsed number of pulses per unit of time in two pulse trains. These pulse trains are translated by the two pulse motors 84 and 86, FIG. 4, into corresponding accumulated shaft angles and these angles are translated by the rack and pinion mechanism into chart distances. Acting together, these distance measurements move the stylus 74. As the stylus moves, it clears a line on the glass surface, which appears black to the observer because it has been divested of aluminum flakes. Thus a black line appears to be drawn on the chart. This line is so drawn by the stylus as to reproduce on the chart, to scale, the course of the boat.

What is claimed is:

1. A course plotter carried by a marine vessel comprising,
   a compass including means having a signal output representing heading of said marine vessel,
   a marine speedometer including means having a signal output representing the speed of said marine vessel,
   means resolving said speedometer output signal into two signals representing the orthogonal components thereof,
   a pair of resetting integrators each having a respective one of said two signals applied thereto, each of said resetting integrators emitting a number of pulses representing the integral of the signal input of the integrator,
   and display means including a marine chart, said display means having said integrator pulse train outputs applied thereto for visual indication thereon of the course of said marine vessel.

2. A course plotter carried by a marine vessel comprising, a compass including means producing an azimuth angle signal output representing the heading of said marine vessel, a marine speedometer including means producing a speed signal output magnitude representing the vessel's speed in said heading direction, a resolver receiving said angle and speed signals generating signals representing sine and cosine of said azimuth angle and multiplying them by the speed signal to emit two signals representing orthogonal components of speed, a pair of identical resetting integrators each having a respective one of said orthogonal component signals applied thereto and each emitting a pulse train the number of pulses per unit time of which represent the time integrals of said orthogonal component inputs, display means including a marine chart and stylus means thereon for recording the course, and motor means operated by said pulse trains for moving said stylus in two orthogonal directions.

3. A course plotter carried by a marine vessel comprising, a flux gate compass having a shaft output, the angular deflection thereof constituting an azimuth signal representing the heading of said vessel, a marine speedometer having an electrical speed signal output magnitude representing the vessel's speed in said heading direction, a sine-cosine potentiometer receiving said azimuth and speed signals and emitting two electrical signals representing the north-south and east-west magnetic components of vessel's speed, a pair of identical resetting integrators each having a respective one of said two electrical signals applied thereto, each resetting integrator emitting at one or the other of two output terminals, depending on the sense of the output signal, a train of pulses, one for each resetting cycle, the total number of pulses during a selected unit of time representing the time integral of the integrator input signal, and display means including a marine chart and a stylus for recording the vessel's course thereon, said display means including motive means receiving a pulse train from each said resetting integrator to move said stylus in two orthogonal directions.

4. A course plotter carried by a marine vessel comprising, compass means having a signal output representing the heading of said vessel, marine speedometer means having a speed signal output representing the vessel's speed, resolver means receiving said angle and speed signals and generating two signals representing orthogonal components of speed, a pair of identical resetting integrators, each said integrator including;

a Miller integrator, means for automatically resetting said Miller integrator, and means emitting an electrical pulse when said Miller integrator is reset; said resetting integrators each having a respective one of said orthogonal component signals applied thereto and each emitting pulses the number of which per unit of time represents the time integral of the input signal, and display means including a marine chart and stylus means thereon for recording the course, said stylus means being moved in two orthogonal directions by the pulse train outputs of said pair of resetting integrators.

5. A course plotter carried by a marine vessel comprising, a compass having an azimuth angle signal output representing the heading of said vessel, a marine speedometer having a speed signal output magnitude representing the vessel's speed in said heading direction, a resolver receiving said angle and speed signals, generating second signals representing the sine and cosine of the heading angle and multiplying said second signals by the speed signal to emit two signals representing orthogonal components of speed;

a pair of identical resetting integrators, each said integrator including a Miller integrator including an amplifier shunted by a capacitor and in series with a resistor, means including two relays and a measuring capacitor and resistor for resetting said Miller integrator, and means operated by said last-named means for emitting one electrical pulse each time that said Miller integrator is reset, said resetting integrators having said orthogonal component signals applied respectively thereto and each resetting integrator emitting pulses the number of which per unit of time represents the time integral of the input signal; and display means including a marine chart and stylus for recording the course and including motive means for moving the stylus in two orthogonal directions by application of said two pulse trains thereto.

References Cited in the file of this patent
UNITED STATES PATENTS

| | | |
|---|---|---|
| 1,873,126 | Hugershoff | Aug. 23, 1932 |
| 2,395,351 | Sohn | Feb. 19, 1946 |
| 2,541,277 | Omberg et al. | Feb. 13, 1951 |
| 2,652,979 | Chance | Sept. 22, 1953 |
| 2,744,683 | Gray | May 8, 1956 |
| 2,787,511 | Ehret | Apr. 2, 1957 |
| 2,857,234 | Murray | Oct. 21, 1958 |
| 2,902,236 | Yost et al. | Sept. 1, 1959 |
| 2,916,202 | Beishline | Dec. 8, 1959 |
| 2,948,580 | Eisenstark | Aug. 9, 1960 |